July 26, 1949.  J. J. BROÏDO  2,477,235
CAMERA WITH PHOTOELECTRIC CELL
DIAPHRAGM OPENING INDICATOR
Filed March 1, 1945

INVENTOR
Jacques Jean Broïdo
By Otto Munk
his ATTY.

Patented July 26, 1949

2,477,235

UNITED STATES PATENT OFFICE 2,477,235

CAMERA WITH PHOTOELECTRIC CELL DIAPHRAGM OPENING INDICATOR

Jacques Jean Broïdo, Joinville-le-Pont, France

Application March 1, 1945, Serial No. 580,419
In France August 8, 1942

Section 1, Public Law 690, August 8, 1946
Patent expires August 8, 1962

1 Claim. (Cl. 95—10)

The invention relates to the arrangement in photographic or moving picture cameras of a diaphragm opening indicator or meter.

The various systems ensuring automatic adjustment of the diaphragm opening of the view-taking objective are of a complicated construction and they prevent the use of a multiple lenses carrying turret.

The invention relates to the semi-automatic devices which are adapted to give the operator indications for manually adjusting the diaphragm opening. In the known devices of this type, transmission of the light rays emanating from the subject to the photoelectric cell is effected, either by means of a special optical system, independent from the view-taking objective, or by means of prisms or mirrors adapted to properly deflect the rays passing through said objective. In all cases the systems are still of a complicated structure.

The present invention has for object to provide a diaphragm opening indicator of very simple construction and arrangement, allowing the operator, during a rapid sighting, through the view finder, to be informed of the desired diaphragm opening, which is manually adjusted accordingly, on the lens then in service, whether it be fixed or mounted on a turret. Another object of the invention is to provide means for correcting the indication of the meter in accordance with the speed at which the film is run through the camera and with the rapidity of the emulsion in use.

According to an important feature of the invention, a photoelectric cell is permanently located immediately at the rear of the view-taking objective and is formed with a rectangular opening corresponding to the exposure window of the film gate, whereby the sensitive layer will be reached by the light beam transmitted through said aperture, said window and the diaphragm opening of the objective.

Another feature of this invention resides in the association with the photoelectric cell of a potentiometer adapted to correct the action of the photoelectric cell upon the indicating galvanometer in accordance with the rapidity of the emulsion of the film in use and of the speed of the film through the gate.

Figure 1:
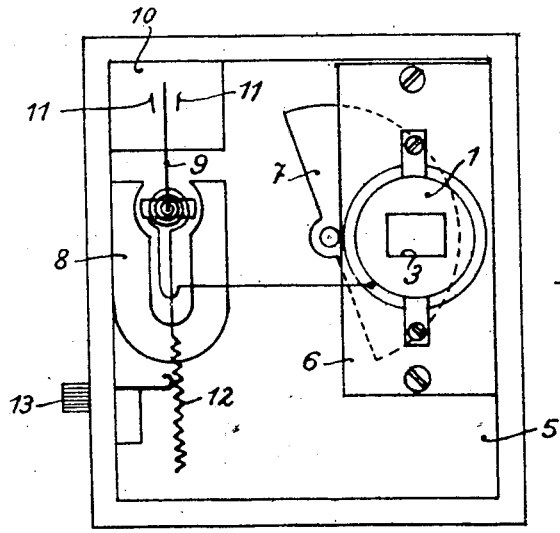

Further objects and features of the invention will be set forth in the following description, with reference to the accompanying drawing, in which:

Fig. 1 is a diagrammatic front view of a moving picture camera, the front plate, carrying the objective or lens turret, being removed.

Figure 2:
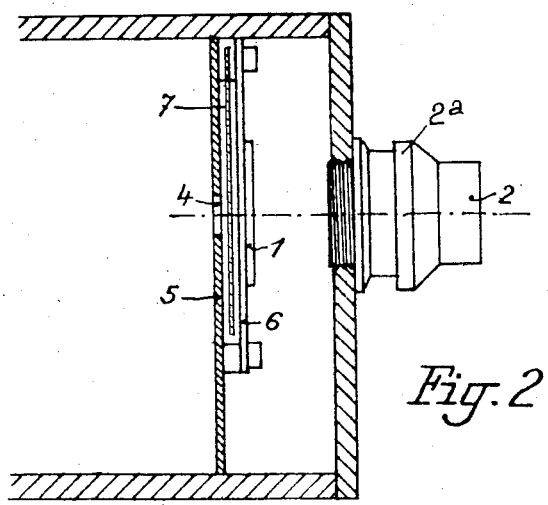

Fig. 2, a diagrammatic sectional view along the optical axis of said camera.

Referring to the drawing, 1 is a flat or plane photoelectric cell the surface of which is such that it falls within the field of any one of the lenses 2 which may be used with the camera. In said plane cell is formed an opening 3 corresponding to the aperture 4 provided in the gate for the exposure of the film, thus leaving passage to the light beam intended to impress the latter, said light beam being controlled by the usual diaphragm 2a of the objective 2.

Cell 1 is secured on an insulating member 6, carried by the platen 5 for the film gate, and spaced therefrom by the distance just necessary for the proper operation of the shutter 7 of the camera inserted therebetween.

The cell is electrically connected to a galvanometer 8, the index 9 of which is adapted to sweep the field of the view-finder 10 of the camera, 11 denoting reference marks corresponding to the maximum and minimum values of the exposure.

A potentiometer 12, adjustable from the outside by means of a handle or knob 13, is adapted to control the electric circuit and to correct the reading of the galvanometer in accordance with the rapidity of the emulsion of the film in use and of the speed at which the film is run through the camera.

The operation is as follows: The operator first brings the handle or knob 13 of the potentiometer opposite a mark corresponding to the rapidity of the emulsion and to the speed of the advance of the film, and, at the same time as he looks at the subject to be photographed through the view-finder 10, he adjusts the opening of the diaphragm of lens 2 so as to bring the index 9 of the meter at the suitable place between the reference marks 11, either for a normal exposure or for any desired over- or under-exposure.

It is obvious that the embodiment above described is given simply by way of example and that numerous modifications in form and detail may be made without departing from the scope of the invention.

Having now described my said invention what I claim as new and desire to secure by Letters Patent is:

In a camera, an objective, a manually adjustable diaphragm for said objective, a film exposure window, a shutter located behind said diaphragm in the path of the light beam and in front of said window to control the latter, a fixed photo-electric cell interposed between said shutter and said diaphragm and having a rectangular opening corresponding to said window, whereby a part of the beam light issuing from the diaphragm opening will reach said exposure window in the open position of said shutter while marginal parts of said beam will constantly reach the solid portion of said cell, and an index electrically controlled by said cell for measuring the intensity of the light transmitted through said diaphragm opening which impinges upon the solid portion of said cell.

JACQUES JEAN BROÏDO.

REFERENCES CITED

The following references are of record in the file of this patent:

UNITED STATES PATENTS

| Number | Name | Date |
|---|---|---|
| 1,993,084 | Brewer | Mar. 5, 1935 |
| 2,058,532 | Tuttle | Oct. 27, 1936 |
| 2,060,089 | Lingg et al. | Nov. 10, 1936 |
| 2,095,312 | Cahn | Oct. 12, 1937 |
| 2,157,660 | Fischer | May 9, 1939 |
| 2,169,927 | Riszdorfer | Aug. 15, 1939 |
| 2,183,768 | Goldhammer | Dec. 19, 1939 |
| 2,194,031 | Riszdorfer | Mar. 19, 1940 |
| 2,210,882 | Carter | Aug. 13, 1940 |
| 2,225,351 | Resk | Dec. 17, 1940 |